US011705928B2

(12) United States Patent
Wang et al.

(10) Patent No.: US 11,705,928 B2
(45) Date of Patent: Jul. 18, 2023

(54) SIGNAL PREDISTORTION CIRCUIT CONFIGURATION

(71) Applicant: REALTEK SEMICONDUCTOR CORPORATION, Hsinchu (TW)

(72) Inventors: Wen-Shan Wang, Hsinchu (TW); Ming-Chun Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/674,865

(22) Filed: Feb. 18, 2022

(65) Prior Publication Data
US 2022/0286152 A1    Sep. 8, 2022

(30) Foreign Application Priority Data

Mar. 8, 2021   (TW) .................. 110108143

(51) Int. Cl.
*H04B 1/04*     (2006.01)
(52) U.S. Cl.
CPC .................. *H04B 1/0475* (2013.01)
(58) Field of Classification Search
CPC .................................................. H04B 1/0475
USPC ........................................................ 375/296
See application file for complete search history.

(56) References Cited

U.S. PATENT DOCUMENTS 9,813,085 B1\* 11/2017 Butler ...................... H04L 5/22
2014/0024325 A1\* 1/2014 Iun ...................... H04B 7/0408
455/127.1

\* cited by examiner

*Primary Examiner* — Kevin M Burd
(74) *Attorney, Agent, or Firm* — WPAT, P.C

(57) ABSTRACT

A signal predistortion circuit configuration includes a digital predistortion circuit, a first transceiver, a first analog front-end (AFE) circuit, a second transceiver, and a second AFE circuit. The digital predistortion circuit outputs a first transmission signal according to first predistortion parameters and outputs a second transmission signal according to second predistortion parameters, and the digital predistortion circuit determines whether to adjust the first predistortion parameters according to a first reception signal and determines whether to adjust the second predistortion parameters according to a second reception signal. A transmitting circuit of the first transceiver, the first AFE circuit, and a receiving circuit of the second transceiver jointly generates the first reception signal according to the first transmission signal. A transmitting circuit of the second transceiver, the second AFE circuit, and a receiving circuit of the first transceiver jointly generates the second reception signal according to the second transmission signal.

14 Claims, 5 Drawing Sheets

SIGNAL PREDISTORTION CIRCUIT CONFIGURATION

BACKGROUND OF THE INVENTION

1. Field of the Invention

The present disclosure relates to a circuit configuration, especially to a signal predistortion circuit configuration.

2. Description of Related Art

Generally, a digital predistortion (DPD) circuit is used for cancelling the non-linear influence of an analog circuit (e.g., a power amplifier). For example, FIG. 1 shows a conventional wireless circuit configuration 100 including a digital signal processor (DSP) 110, a DPD circuit 120, a transmission-end (TX) path 130, a front-end modulator (FEM) 140, and a reception-end (RX) path 150, wherein the TX path 130 includes a digital-to-analog converter (DAC) 132, an upconverter 134, and a power amplifier (PA) 136, the RX path 150 includes a lower noise amplifier (LNA) 152, a downconverter 154, and an analog-to-digital converter (ADC) 156, and the FEM 140 transmits/receives signals through an antenna in a communication mode. When determining digital predistortion parameters, the DPD circuit 120 outputs a predistortion signal according to a predetermined signal (e.g., a signal with a predetermined pattern) and the default setting of the digital predistortion parameters, then the predistortion signal is transmitted through the TX path 130, the TX terminal (Tx) and the RX terminal (Rx) of the FEM 140, and the RX path 150 and returns to the DPD circuit 120, and then the DPD circuit 120 adjusts the digital predistortion parameters according to the difference between the returned predistortion signal and the predetermined signal, wherein the predetermined signal is generated by the DPD circuit 120 itself or comes from the DSP 110. However, in order to optimize the circuit area, the distance between the TX path 130 and the RX path 150 is usually very short, and this cannot sufficiently insulate the TX path 130 from the RX path 150. In light of the above, the signal coupling between the TX path 130 from the RX path 150 is serious, and this prevents the DPD circuit 120 from properly determining the digital predistortion parameters.

In order to prevent the aforementioned problem, a general solution is to set an additional reception path as shown in FIG. 2. In comparison with FIG. 1, the wireless circuit configuration 200 in FIG. 2 further includes a coupler 210, a feedback circuit 220, and a switch 230. The feedback circuit 220 can be a circuit similar/equivalent to the LNA 152 and the downconverter 154. When determining digital predistortion parameters, the DPD circuit 120 outputs a predistortion signal according to a predetermined signal and the default setting of the digital predistortion parameters, then the predistortion signal is transmitted through the TX path 130, the TX terminal (Tx) of the FEM 140, the coupler 210, the feedback circuit 220, the switch 230, and the ADC 156 and returns to the DPD circuit 120, and then the DPD circuit 120 adjusts the digital predistortion parameters according to the difference between the returned predistortion signal and the predetermined signal. Since the distance between the feedback circuit 220 and the TX path 130 is longer than the distance between the RX path 150 and the TX path 130, the configuration of FIG. 2 can prevent serious signal coupling between the TX path 130 from the RX path 150 when training digital predistortion parameters. However, the setting of the coupler 210, the feedback circuit 220, and the switch 230 requires additional pins and circuit areas, and this leads to a higher cost.

Another solution is to lower the requirements for a signal to interference ratio (SIR) in the configuration of FIG. 1 and thereby lower the requirements for the insulation between the TX path 130 and the RX path 150. However, this solution needs a high-end noise reduction algorithm and an advanced circuit design capability, and leads to a high cost and a lot of design difficulties.

SUMMARY OF THE INVENTION

A purpose of the present disclosure is to provide a signal predistortion circuit configuration capable of preventing the problem of the prior art.

An embodiment of the signal predistortion circuit configuration of the present disclosure includes a digital predistortion circuit, a first transmitting circuit, a first receiving circuit, a second transmitting circuit, a second receiving circuit, a first analog-front-end (AFE) circuit, and a second AFE circuit. The digital predistortion circuit is configured to output a first digital transmission signal according to at least one first parameter and output a second digital transmission signal according to at least one second parameter; and the digital predistortion circuit is further configured to determine whether to adjust the at least one first parameter according to a first digital reception signal and determine whether to adjust the at least one second parameter according to a second digital reception signal. The first transmitting circuit is configured to generate a first analog transmission signal according to the first digital transmission signal. The first receiving circuit is configured to generate the second digital reception signal according to a second analog reception signal and transmit the second digital reception signal to the digital predistortion circuit. The second transmitting circuit is configured to generate a second analog transmission signal according to the second digital transmission signal. The second receiving circuit is configured to generate the first digital reception according to a first analog reception signal and transmit the first digital reception signal to the digital predistortion circuit, wherein the minimum distance between the first transmitting circuit and the first receiving circuit is shorter than the minimum distance between the first transmitting circuit and the second receiving circuit, and the minimum distance between the second transmitting circuit and the second receiving circuit is shorter than the minimum distance between the second transmitting circuit and the first receiving circuit. The first AFE circuit is coupled between the first transmitting circuit and the second receiving circuit, and configured to generate the first analog reception signal according to the first analog transmission signal. The second AFE circuit is coupled between the second transmitting circuit and the first receiving circuit, and configured to generate the second analog reception signal according to the second analog transmission signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The specification discloses a signal predistortion circuit configuration capable of improving the insulation between a transmission-end (TX) path and a reception-end (RX) path at a very low cost when performing a digital predistortion (DPD) training process and thereby improving the effect of DPD.

Figure 3:
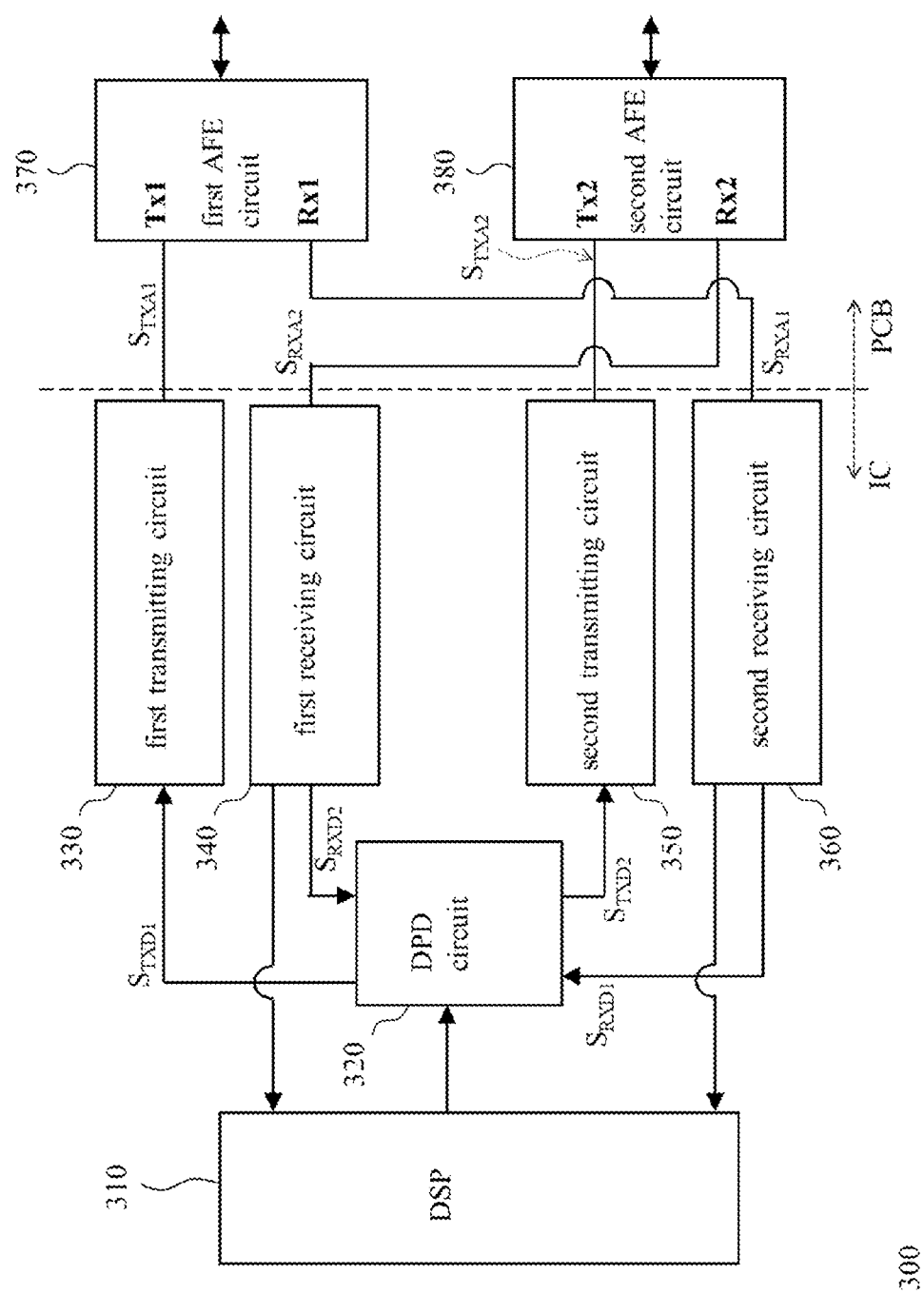
FIG. 3 shows an embodiment of the signal predistortion circuit configuration of the present disclosure.

FIG. 3 shows an embodiment of the signal predistortion circuit configuration of the present disclosure. The signal predistortion circuit configuration 300 of FIG. 3 includes a digital signal processor (DSP) 310, a DPD circuit 320, a first transmitting circuit 330, a first receiving circuit 340, a second transmitting circuit 350, a second receiving circuit 360, a first analog-front-end (AFE) circuit 370, and a second AFE circuit 380. The whole function of the first transmitting circuit 330, the first receiving circuit 340, and the first AFE circuit 370 is similar/equivalent to the whole function of the second transmitting circuit 350, the second receiving circuit 360, and the second AFE circuit 380.

Please refer to FIG. 3. In an exemplary implementation, the signal predistortion circuit configuration 300 is applied to a multi-input multi-output (MIMO) wireless communication device (not shown in FIG. 3). In this implementation, the first transmitting circuit 330 includes a first radio-frequency (RF) transmitting circuit (not shown in FIG. 3); the first AFE circuit 370 is included in a first front-end modulator (FEM) (not shown in FIG. 3), and the first AFE circuit 370 is configured to transmit a signal from a first TX terminal (Tx1) to a first RX terminal (Rx1) in a training mode and transmit/receive a signal through an antenna in a communication mode; and the first receiving circuit 340 includes a first RF receiving circuit (not shown in FIG. 3). In addition, the second transmitting circuit 350 includes a second RF transmitting circuit (not shown in FIG. 3); the second AFE circuit 380 is included in a second FEM (not shown in FIG. 3), and the second AFE circuit 380 is configured to transmit a signal from a second TX terminal (Tx2) to a second RX terminal (Rx2) in the training mode and transmit/receive a signal through an antenna in the communication mode; and the second receiving circuit 360 includes a second RF receiving circuit (not shown in the figures). Furthermore, both the DSP circuit 310 and the DPD circuit 320 are included in a digital baseband circuit (not shown in FIG. 3). The above-mentioned circuits not shown in FIG. 3 are well known in this technical field and fall beyond the scope of the present discussion, and their details are omitted here.

Please refer to FIG. 3. In another exemplary implementation, the signal predistortion circuit configuration 300 is applied to an audio device (not shown in FIG. 3). In this implementation, the first transmitting circuit 330 includes a first digital-to-analog converter (DAC) (not shown in FIG. 3); the first AFE circuit 370 includes a first amplifier (not shown in FIG. 3), and the first AFE circuit 370 is configured to transmit a signal from the Tx1 to the Rx1 in a training mode and transmit/receive a signal to/from an external device (e.g., a speaker or earphone) in a playback mode; and the first receiving circuit 340 includes a first analog-to-digital converter (ADC) (not shown in FIG. 3). In addition, the second transmitting circuit 350 includes a second DAC (not shown in FIG. 3); the second AFE circuit 380 includes a second amplifier (not shown in FIG. 3), and the second AFE circuit 380 is configured to transmit a signal from the Tx2 to the Rx2 in the training mode and transmit/receive a signal to/from the external device in the playback mode; and the second receiving circuit 360 includes a second ADC (not shown in FIG. 3). Furthermore, both the DSP circuit and the DPD circuit 320 are included in a digital audio circuit (not shown in FIG. 3). The above-mentioned circuits not shown in FIG. 3 are well known in this technical field and fall beyond the scope of the present discussion, and their details are omitted here.

Please refer to FIG. 3. The first transmitting circuit 330 is next to the first receiving circuit 340, and the insulation between the two circuits is probably insufficient. The second transmitting circuit 350 is next to the second receiving circuit 360, and the insulation between the two circuits is probably insufficient. In order to prevent the signal coupling caused by the insufficient insulation from affecting the effect of DPD, the signal predistortion circuit configuration 300 uses the first transmitting circuit 330, the first AFE circuit 370, and the second receiving circuit 360 as a signal loop for a first DPD training process, and uses the second transmitting circuit 350, the second AFE circuit 380, and the first receiving circuit 340 as another signal loop for a second DPD training process. Since the minimum distance between the first transmitting circuit 330 and the second receiving circuit 360 is much greater than the minimum distance between the first transmitting circuit 330 and the first receiving circuit 340, the insulation between the first transmitting circuit 330 and the second receiving circuit 360 is relatively better, and thus the influence of the signal coupling on the effect of DPD can be reduced. Similarly, since the minimum distance between the second transmitting circuit 350 and the first receiving circuit 340 is much greater than the minimum distance between the second transmitting circuit 350 and the second receiving circuit 360, the insulation between the second transmitting circuit 350 and the first receiving circuit 340 is relatively better, and thus the influence of the signal coupling on the effect of DPD can be reduced.

Please refer to FIG. 3. When performing the first DPD training process, the DPD circuit 320 processes (e.g., distorts) a first original signal according to at least one first predistortion parameter and thereby outputs a first digital transmission signal ($S_{TXD1}$). Afterward, the first digital transmission signal is transmitted through the first transmitting circuit 330, the Tx1 of the first AFE circuit 370, the Rx1 of the first AFE circuit 370, and the second receiving circuit 360 and then returns to the DPD circuit 320; accordingly, the DPD circuit 320 can determine whether to adjust the at least one first predistortion parameter according to the difference between the returned signal (i.e., the first digital reception signal ($S_{RXD1}$)) and the first original signal and thereby minimize the difference or ensure that the difference is small enough to fulfill the effect of DPD. In an exemplary implementation, the first original signal is generated by the DPD circuit 320 itself; in another exemplary implementation, the first original signal is generated by the DSP 310. It should be noted that the first digital reception signal is under a first non-linear influence of the first transmitting circuit 330, the first AFE circuit 370, and the second receiving circuit 360, and the digital predistortion circuit 320 adjusts the at least one first predistortion parameter to reduce/eliminate the first non-linear influence.

Please refer to FIG. 3. When performing the second DPD training process, the DPD circuit 320 processes (e.g., distorts) a second original signal according to at least one second predistortion parameter and thereby outputs a second digital transmission signal ($S_{TXD2}$) Afterward, the second digital transmission signal is transmitted through the second transmitting circuit 350, the Tx2 of the second AFE circuit 380, the Rx2 of the second AFE circuit 380, and the first receiving circuit 340 and then returns to the DPD circuit 320; accordingly, the DPD circuit 320 can determine whether to adjust the at least one second predistortion parameter according to the difference between the returned signal (i.e., the second digital reception signal ($S_{RXD2}$)) and the second original signal and thereby minimize the difference or ensure that the difference is small enough to fulfill the effect of DPD. In an exemplary implementation, the second original signal is generated by the DPD circuit 320 itself; in another exemplary implementation, the second original signal is generated by the DSP 310. It should be noted that the second digital reception signal is under a second non-linear influence of the second transmitting circuit 350, the second AFE circuit 380, and the first receiving circuit 340, and the digital predistortion circuit 320 adjusts the at least one second predistortion parameter to reduce/eliminate the second non-linear influence.

On the basis of the above description, the first transmitting circuit 330 is configured to generate a first analog transmission signal ($S_{TXA1}$) according to the first digital transmission signal ($S_{TXD1}$), and the first receiving circuit 340 is configured to generate the second digital reception signal ($S_{RXD2}$) according to a second analog reception signal ($S_{RXA2}$) and then transmit the second digital reception signal to the DPD circuit 320. In addition, the second transmitting circuit 350 is configured to generate a second analog transmission signal ($S_{TXA2}$) according to the second digital transmission signal ($S_{TXD2}$), and the second receiving circuit 360 is configured to generate the first digital reception signal ($S_{RXD1}$) according to a first analog reception signal ($S_{RXA1}$) and then transmit the first digital reception signal to the DPD circuit 320. The first AFE circuit 370 is coupled between the first transmitting circuit 330 and the second receiving circuit 360, and configured to generate the first analog reception signal ($S_{RXA1}$) according to the first analog transmission signal ($S_{TXA1}$) The second AFE circuit 380 is coupled between the second transmitting circuit 350 and the first receiving circuit 340, and configured to generate the second analog reception signal ($S_{RXA2}$) according to the second analog transmission signal ($S_{TXA2}$).

In an exemplary implementation, all of the first transmitting circuit 330, the first receiving circuit 340, the second transmitting circuit 350, and the second receiving circuit 360 are included in an integrated circuit (i.e., the label "IC" in FIG. 3) while the DPD circuit 320 can be included in the same integrated circuit or in another integrated circuit. In addition, the first AFE circuit 370 and the second AFE circuit 380 are set in a circuit board (e.g., a printed circuit board) (i.e., the label "PCB" in FIG. 3), and they are not included in the above-mentioned integrated circuit. The first AFE circuit 370 is coupled to the second receiving circuit 360 through a first trace of the circuit board and a first connection interface (e.g., a pin or a solder ball) (not shown in the figures). The second AFE circuit 380 is coupled to the first receiving circuit 340 through a second trace of the circuit board and a second connection interface (e.g., a pin or a solder ball) (not shown in the figures).

Figure 1:
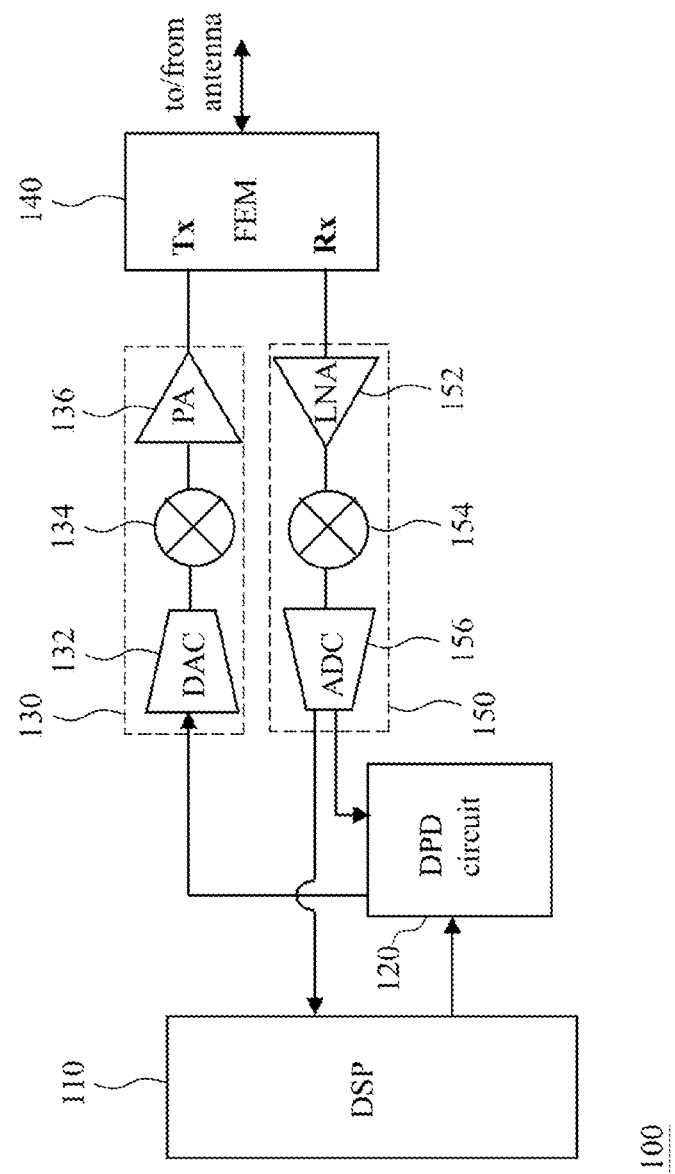
FIG. 1 shows a conventional wireless circuit configuration.
Figure 2:
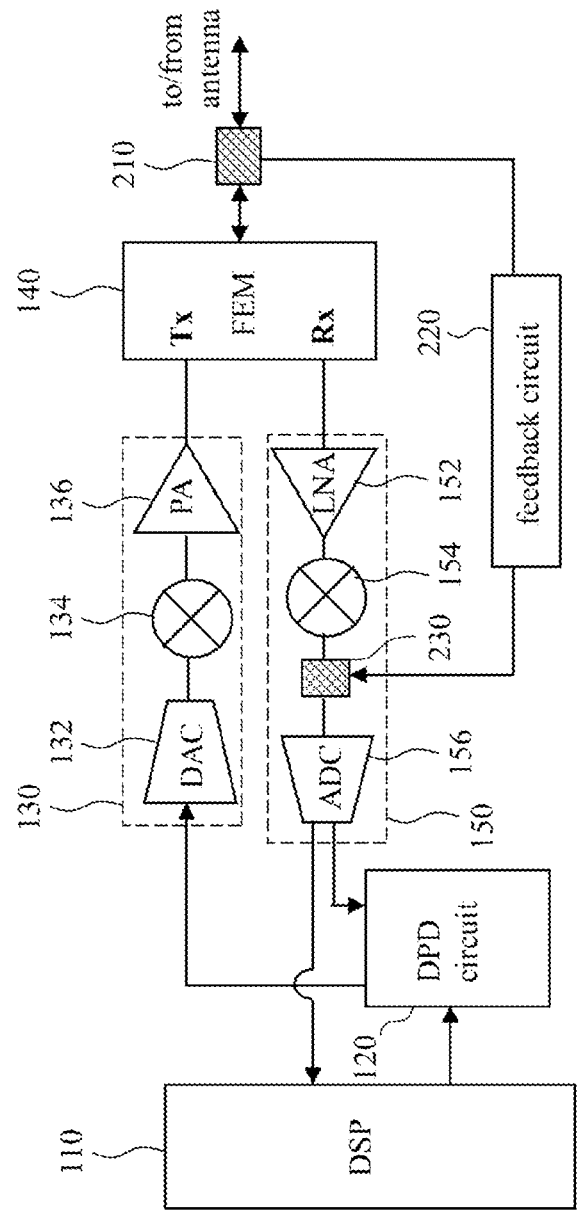
FIG. 2 shows another conventional wireless circuit configuration.
Figure 4:
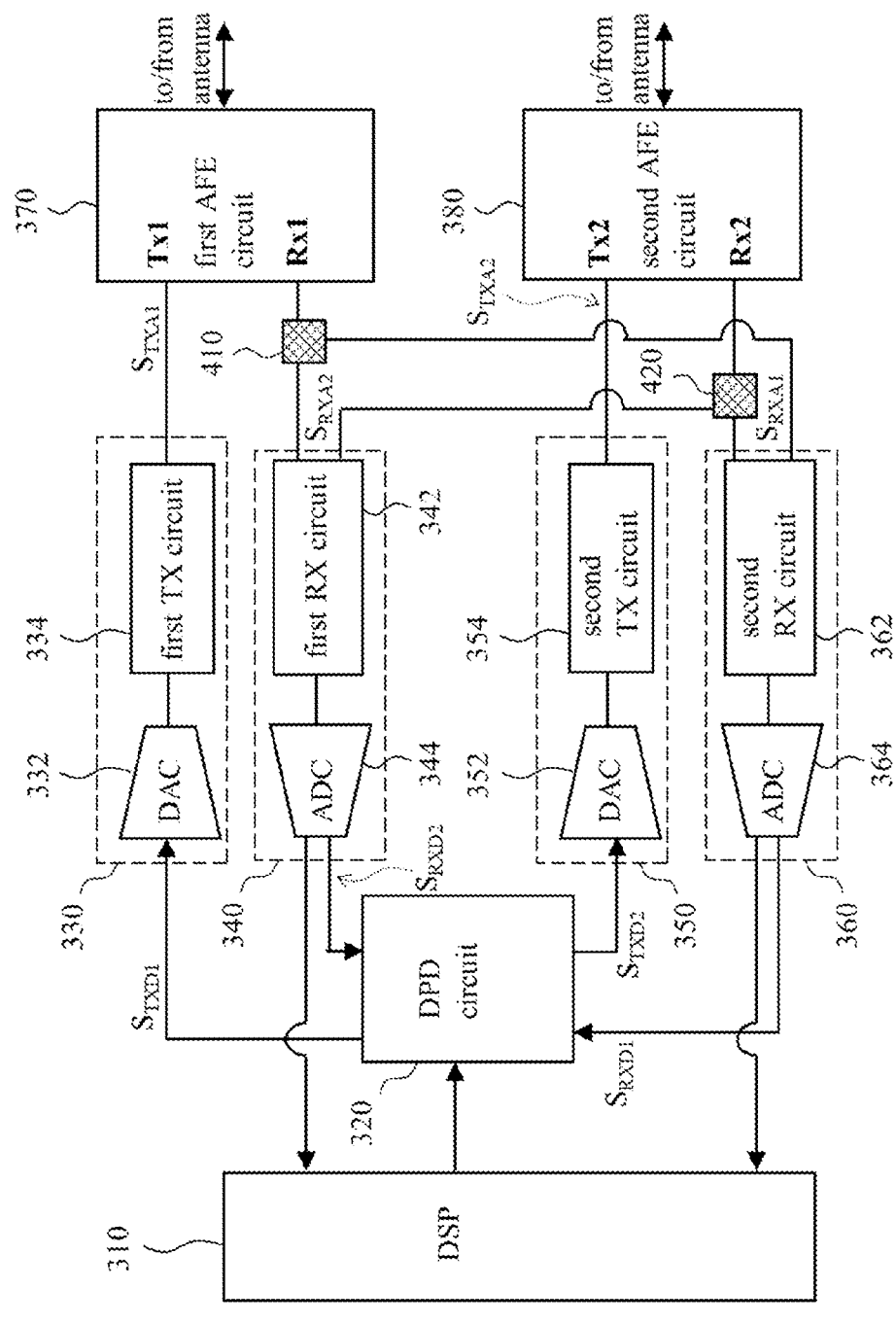
FIG. 4 shows an embodiment of the first transmitting circuit, the first receiving circuit, the second transmitting circuit, and the second receiving circuit.

FIG. 4 shows an embodiment of the first transmitting circuit 330, the first receiving circuit 340, the second transmitting circuit 350, and the second receiving circuit 360. The first transmitting circuit 330 includes a first DAC 332 and a first TX circuit 334 (e.g., a circuit including an upconverter and a power amplifier as shown in FIGS. 1-2, wherein the power amplifier has a non-linear characteristic normally). The first DAC 332 is configured to generate a first conversion signal according to the first digital transmission signal ($S_{TXD1}$). The first TX circuit 334 is configured to generate the first analog transmission signal ($S_{TXA1}$) according to the first conversion signal. The first receiving circuit 340 includes a first RX circuit 342 (e.g., a circuit including a low noise amplifier and a downconverter as shown in FIGS. 1-2) and a first ADC 344. The first RX circuit 342 is configured to generate a second to-be-converted signal according to the second analog reception signal ($S_{RXA2}$) The first ADC 344 is configured to generate the second digital reception signal ($S_{RXD2}$) according to the second to-be-converted signal. Similarly, the second transmitting circuit 350 includes a second DAC 352 and a second TX circuit 354 (e.g., a circuit including an upconverter and a power amplifier as shown in FIGS. 1-2, wherein the power amplifier has a non-linear characteristic normally) The second DAC 352 is configured to generate a second conversion signal according to the second digital transmission signal ($S_{TXD2}$) The second TX circuit 354 is configured to generate the second analog transmission signal ($S_{TXA2}$) according to the second conversion signal. The second receiving circuit 360 includes a second RX circuit 362 (e.g., a circuit including a low noise amplifier and a downconverter as shown in FIGS. 1-2) and a second ADC 364. The second receiving circuit 362 is configured to generate a first to-be-converted signal according to the first analog reception signal ($S_{RXA1}$). The second ADC 364 is configured to generate the first digital reception signal ($S_{RXD1}$) according to the first to-be-converted signal.

Please refer to FIG. 4. In an exemplary implementation, the signal predistortion circuit configuration 300 is applied to a wireless communication device and further includes a first switch circuit 410 and a second switch circuit 420. The first switch circuit 410 is coupled to the first AFE circuit 370 and the second receiving circuit 360 in a training mode, and is coupled to the first AFE circuit 370 and the first receiving circuit 340 in a communication mode. The second switch circuit 420 is coupled to the second AFE circuit 380 and the first receiving circuit 340 in the training mode, and is coupled to the second AFE circuit 380 and the second receiving circuit 360 in the communication mode. The DSP 410 is configured to receive a first communication signal through the first AFE circuit 370, the first switch circuit 410, and the first receiving circuit 340 and process the first communication signal in the communication mode. The DSP 410 is further configured to receive a second communication signal through the second AFE circuit 380, the second switch circuit 420, and the second receiving circuit 360 and process the second communication signal in the communication mode. The first communication signal is originated from a first external wireless device (not shown in the figures), and the second communication signal is originated from the first external wireless device or a second external wireless device (not shown in the figures). The first/second external wireless device wirelessly communicates with the wireless communication device to which the signal predistortion circuit configuration 300 is applied. To sum up, the signal reception path in the training mode is different from the signal reception path in the communication mode.

Please refer to FIG. 4. The first digital reception signal ($S_{RXD1}$) is under a first non-linear influence of the first transmitting circuit 330, the first AFE circuit 370, and the second receiving circuit 360. The second digital reception signal ($S_{RXD2}$) is under a second non-linear influence of the second transmitting circuit 350, the second AFE circuit 380, and the first receiving circuit 340. In an exemplary implementation, the contribution made by the second receiving circuit 360 to the first non-linear influence is similar to the contribution made by the first receiving circuit 340 to the second non-linear influence; for example, the difference between the two contributions is lower than −10 decibel (dB). This small difference ensures that the parameter(s) determined in the training mode is applicable to the operation in the communication mode. In another exemplary implementation, the contribution made by the second receiving circuit 360 to the first non-linear influence is much lower than the contribution made by the first transmitting circuit 330 and the first AFE circuit 370 to the first non-linear influence; for example, the difference between the two contributions is greater than 10 dB. In addition, the contribution made by the first receiving circuit 340 to the second non-linear influence is much lower than the contribution made by the second transmitting circuit 350 and the second AFE circuit 380 to the second non-linear influence; for example, the difference between the two contributions is greater than 10 dB. In brief, in this implementation the contribution made by the transmitting circuit and the AFE circuit is dominant, and the contribution made by the receiving circuit is insignificant.

Please refer to FIG. 3 and the description of FIGS. 3-4. In an exemplary implementation, the signal reception path in the training mode is the same as the signal reception path in the communication mode; accordingly, the switch circuits (e.g., the first switch circuit 410 and the second switch circuit 420 of FIG. 4) operating according to the change of modes are not necessary, and the DSP 310 is configured to receive and process the first communication signal through the first AFE circuit 370 and the second receiving circuit 360 in the communication mode, and further configured to receive and process the second communication signal through the second AFE circuit 380 and the first receiving circuit 340 in the communication mode. Since those having ordinary skill in the art can appreciate the detail and modification of this implementation according to the embodiments and the exemplary implementations described in the preceding paragraphs, repeated and redundant description is omitted here.

It should be noted that in the communication mode the DPD circuit 320 can leave the at least one first predistortion parameter unchanged and/or leave the at least one second predistortion parameter unchanged; or in the communication mode the DPD circuit 320 can determine whether to adjust the at least one first predistortion parameter according to the first wireless communication signal, and/or determine whether to adjust the at least one second predistortion parameter according to the second wireless communication signal.

Figure 5:
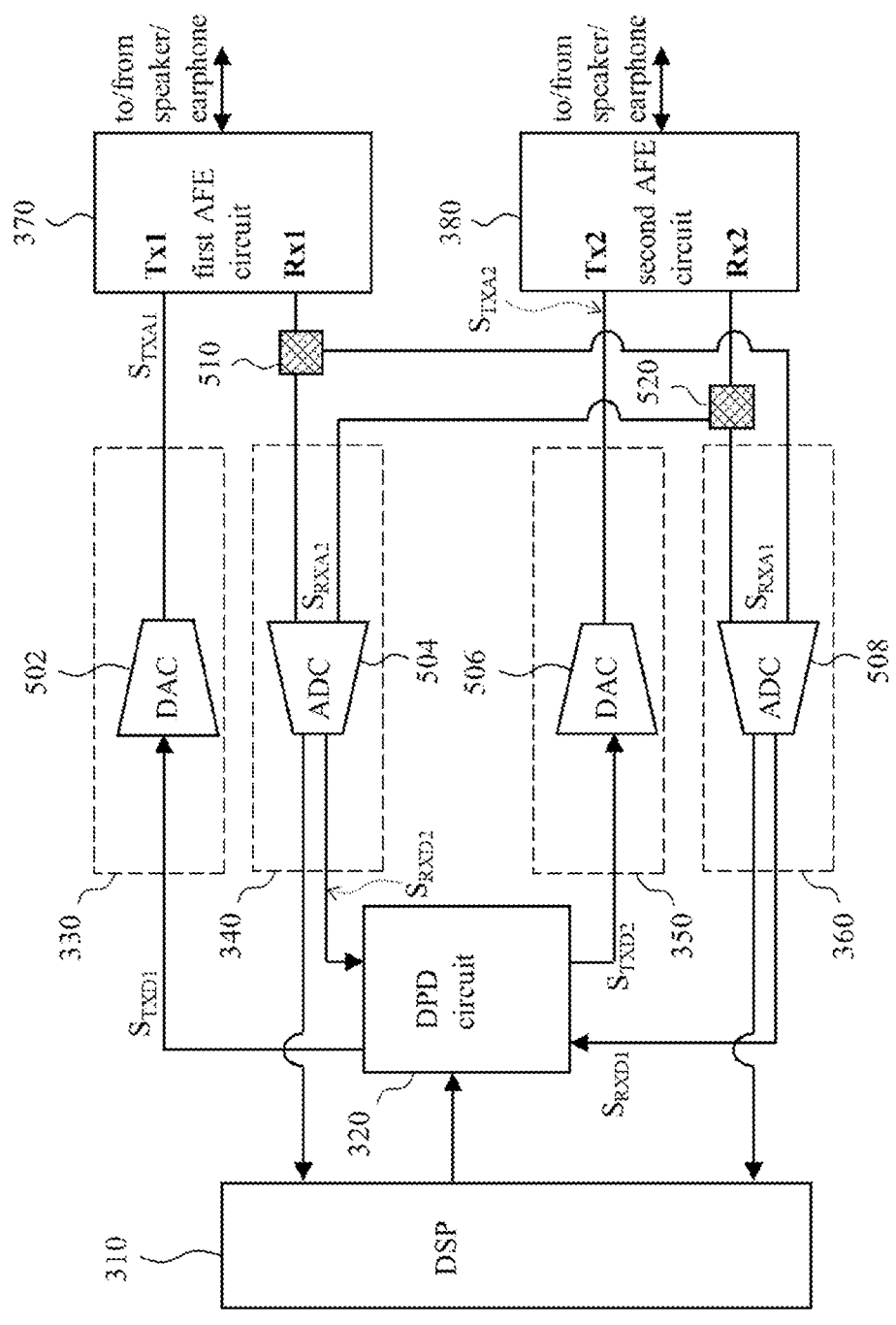
FIG. 5 shows another embodiment of the first transmitting circuit, the first receiving circuit, the second transmitting circuit, and the second receiving circuit.

FIG. 5 shows another embodiment of the first transmitting circuit 330, the first receiving circuit 340, the second transmitting circuit 350, and the second receiving circuit 360. The first transmitting circuit 330 includes a first DAC 502 that is configured to generate the first analog transmission signal ($S_{TXA1}$) according to the first digital transmission signal ($S_{TXD1}$) The first receiving circuit 340 includes a first ADC 504 that is configured to generate the second digital reception signal ($S_{RXD2}$) according to the second analog reception signal ($S_{RXA2}$). The second transmitting circuit 350 includes a second DAC 506 that is configured to generate the second analog transmission signal ($S_{TXA2}$) according to the second digital transmission signal ($S_{TXD2}$). The second receiving circuit 360 includes a second ADC 508 that is configured to generate the first digital reception signal ($S_{RXD1}$) according to the first analog reception signal ($S_{RXA1}$).

Please refer to FIG. 5. In an exemplary implementation, the signal predistortion circuit configuration 300 is applied to an audio device and further includes a first switch circuit 510 and a second switch circuit 520. The first switch circuit 510 is coupled to the first AFE circuit 370 and the second receiving circuit 360 in a training mode, and coupled to the first AFE circuit 370 and the first receiving circuit 340 in a playback mode. The second switch circuit 520 is coupled to the second AFE circuit 380 and the first receiving circuit 340 in the training mode, and coupled to the second AFE circuit 380 and the second receiving circuit 360 in the playback mode. The DSP 410 is configured to receive and process a first audio signal (e.g., a first audio control signal from a speaker/earphone) through the first AFE circuit 370, the first switch circuit 510, and the first receiving circuit 340 in the playback mode. The DSP 410 is further configured to receive and process a second audio signal (e.g., a second audio control signal from a speaker/earphone) through the second AFE circuit 380, the second switch circuit 520, and the second receiving circuit 360 in the playback mode. In brief, the signal reception path in the training mode is different from the signal reception path in the playback mode. It should be noted that the limitations on the contributions made by the circuits to the first non-linear influence and the second non-linear influence described in the preceding paragraph are applicable to the above implementation. It should also be noted that in the playback mode the DPD circuit 320 can leave the at least one first predistortion parameter unchanged and/or leave the at least one second predistortion parameter unchanged; or in the playback mode the DPD circuit 320 can determine whether to adjust the at least one first predistortion parameter according to the first audio signal, and/or determine whether to adjust the at least one second predistortion parameter according to the second audio signal.

Please refer to FIG. 3 and the descriptions of FIG. 3 and FIG. 5. In an exemplary implementation, the signal reception path in the training mode is the same as the signal reception path in the playback mode; accordingly, the switch circuits (e.g., the first switch circuit 510 and the second switch circuit 520 of FIG. 5) operating according to the change of modes are not necessary, and the DSP 310 is configured to receive and process the first audio signal through the first AFE circuit 370 and the second receiving circuit 360 in the playback mode, and further configured to receive and process the second audio signal through the second AFE circuit 380 and the first receiving circuit 340 in the playback mode. Since those having ordinary skill in the art can appreciate the detail and modification of this implementation according to the embodiments and the exemplary implementations described in the preceding paragraphs, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly.

To sum up, the signal predistortion circuit configuration of the present disclosure can improve the insulation between a TX path and an RX path during the execution of DPD training, and therefore can improve the effect of DPD.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A signal predistortion circuit configuration, comprising:
   a digital predistortion circuit configured to output a first digital transmission signal according to at least one first parameter for first digital predistortion training and configured to output a second digital transmission signal according to at least one second parameter for second digital predistortion training, the digital predistortion circuit further configured to determine whether to adjust the at least one first parameter according to a first digital reception signal for the first digital predistortion training and configured to determine whether to adjust the at least one second parameter according to a second digital reception signal for the second digital predistortion training;
   a first transmitting circuit configured to generate a first analog transmission signal according to the first digital transmission signal for the first digital predistortion training;
   a first receiving circuit configured to generate the second digital reception signal according to a second analog reception signal and transmit the second digital reception signal to the digital predistortion circuit for the second digital predistortion training;
   a second transmitting circuit configured to generate a second analog transmission signal according to the second digital transmission signal for the second digital predistortion training;
   a second receiving circuit configured to generate the first digital reception signal according to a first analog reception signal and transmit the first digital reception signal to the digital predistortion circuit for the first digital predistortion training, wherein a minimum distance between the first transmitting circuit and the second receiving circuit is longer than a minimum distance between the first transmitting circuit and the first receiving circuit to improve insulation when the first digital predistortion training is performed, and a minimum distance between the second transmitting circuit and the first receiving circuit is longer than a minimum distance between the second transmitting circuit and the second receiving circuit to improve insulation when the second digital predistortion training is performed;
   a first analog-front-end (AFE) circuit coupled between the first transmitting circuit and the second receiving circuit, the first AFE circuit configured to generate the first analog reception signal according to the first analog transmission signal for the first digital predistortion training; and
   a second AFE circuit coupled between the second transmitting circuit and the first receiving circuit, the second AFE circuit configured to generate the second analog reception signal according to the second analog transmission signal for the second digital predistortion training.

2. The signal predistortion circuit configuration of claim 1, wherein all of the first transmitting circuit, the first receiving circuit, the second transmitting circuit, and the second receiving circuit are included in an integrated circuit; the first AFE circuit and the second AFE circuit are outside the integrated circuit and set on a circuit board; and the first AFE circuit is coupled to the second receiving circuit via a first trace of the circuit board, and the second AFE circuit is coupled to the first receiving circuit via a second trace of the circuit board.

3. The signal predistortion circuit configuration of claim 1, wherein:
   the first transmitting circuit includes:
      a first digital-to-analog converter (DAC) configured to generate a first conversion signal according to the first digital transmission signal; and
      a first transmission-end (TX) circuit configured to generate the first analog transmission signal according to the first conversion signal;
   the first receiving circuit includes:
      a first reception-end (RX) circuit configured to generate a second to-be-converted signal according to the second analog reception signal; and
      a first analog-to-digital converter (ADC) configured to generate the second digital reception signal according to the second to-be-converted signal;
   the second transmitting circuit includes:
      a second DAC configured to generate a second conversion signal according to the second digital transmission signal; and
      a second TX circuit configured to generate the second analog transmission signal according to the second conversion signal; and
   the second receiving circuit includes:
      a second RX circuit configured to generate a first to-be-converted signal according to the first analog reception signal; and
      a second ADC configured to generate the first digital reception signal according to the first to-be-converted signal.

4. The signal predistortion circuit configuration of claim 3, wherein the signal predistortion circuit configuration is included in a wireless communication device; the first transmitting circuit includes a first radio-frequency (RF) transmitting circuit, the first AFE circuit is included in a first front-end modulator, and the first receiving circuit includes a first RF receiving circuit; and the second transmitting circuit includes a second RF transmitting circuit, the second AFE circuit is included in a second front-end modulator, and the second receiving circuit includes a second RF receiving circuit; and the digital predistortion circuit is included in a baseband circuit.

5. The signal predistortion circuit configuration of claim 4, further comprising:
   a first switch circuit configured to be coupled with the first AFE circuit and the second receiving circuit in a training mode, and configured to be coupled with the first AFE circuit and the first receiving circuit in a communication mode;
   a second switch circuit configured to be coupled with the second AFE circuit and the first receiving circuit in the training mode, and configured to be coupled with the second AFE circuit and the second receiving circuit in the communication mode; and a digital signal processor (DSP) coupled to the first receiving circuit and the second receiving circuit, the DSP configured to receive and process a first communication signal through the first AFE circuit, the first switch circuit, and the first receiving circuit in the communication mode, and the DSP further configured to receive and process a second communication signal through the second AFE circuit, the second switch circuit, and the second receiving circuit in the communication mode, wherein the first communication signal is originated from a first external wireless device, and the second communication signal is originated from the first external wireless device or a second external wireless device.

6. The signal predistortion circuit configuration of claim 5, wherein the first digital reception signal is under a first non-linear influence of the first transmitting circuit, the first AFE circuit, and the second receiving circuit; the second digital reception signal is under a second non-linear influence of the second transmitting circuit, the second AFE circuit, and the first receiving circuit; and a contribution difference between a first contribution made by the second receiving circuit to the first non-linear influence and a second contribution made by the first receiving circuit to the second non-linear influence is lower than −10 decibel (dB).

7. The signal predistortion circuit configuration of claim 5, wherein the first digital reception signal is under a first non-linear influence of the first transmitting circuit, the first AFE circuit, and the second receiving circuit; the second digital reception signal is under a second non-linear influence of the second transmitting circuit, the second AFE circuit, and the first receiving circuit; a first contribution difference between a first contribution made by the second receiving circuit to the first non-linear influence and a second contribution made by the first transmitting circuit and the first AFE circuit to the first non-linear influence is greater than 10 decibel (dB); and a second contribution difference between a third contribution made by the first receiving circuit to the second non-linear influence and a fourth contribution made by the second transmitting circuit and the second AFE circuit to the second non-linear influence is greater than 10 dB.

8. The signal predistortion circuit configuration of claim 4, further comprising:
a first wiring circuit configured to be coupled with the first AFE circuit and the second receiving circuit in a training mode, and configured to be coupled with the first AFE circuit and the second receiving circuit in a communication mode;
a second wiring circuit configured to be coupled with the second AFE circuit and the first receiving circuit in the training mode, and configured to be coupled with the second AFE circuit and the first receiving circuit in the communication mode; and
a digital signal processor (DSP) coupled to the first receiving circuit and the second receiving circuit, the DSP configured to receive and process a first communication signal through the first AFE circuit and the second receiving circuit in the communication mode, and the DSP further configured to receive and process a second communication signal through the second AFE circuit and the first receiving circuit,
wherein the first communication signal is originated from a first external wireless device, and the second communication signal is originated from the first external wireless device or a second external wireless device.

9. The signal predistortion circuit configuration of claim 1, wherein:
the first transmitting circuit includes:
a first digital-to-analog converter (DAC) configured to generate the first analog transmission signal according to the first digital transmission signal;
the first receiving circuit includes:
a first analog-to-digital converter (ADC) configured to generate the second digital reception signal according to the second analog reception signal;
the second transmitting circuit includes:
a second DAC configured to generate the second analog transmission signal according to the second digital transmission signal; and
the second receiving circuit includes:
a second ADC configured to generate the first digital reception signal according to the first analog reception signal.

10. The signal predistortion circuit configuration of claim 9, wherein the signal predistortion circuit configuration is included in an audio device; the first AFE circuit includes a first amplifier; and the second AFE circuit includes a second amplifier.

11. The signal predistortion circuit configuration of claim 10, further comprising:
a first switch circuit configured to be coupled with the first AFE circuit and the second receiving circuit in a training mode, and configured to be coupled with the first AFE circuit and the first receiving circuit in a playback mode;
a second switch circuit configured to be coupled with the second AFE circuit and the first receiving circuit in the training mode, and configured to be coupled with the second AFE circuit and the second receiving circuit in the playback mode; and
a digital signal processor (DSP) coupled to the first receiving circuit and the second receiving circuit, the DSP configured to receive and process a first audio signal through the first AFE circuit, the first switch circuit, and the first receiving circuit in the playback mode, and the DSP further configured to receive and process a second audio signal through the second AFE circuit, the second switch circuit, and the second receiving circuit in the playback mode.

12. The signal predistortion circuit configuration of claim 11, wherein the first digital reception signal is under a first non-linear influence of the first transmitting circuit, the first AFE circuit, and the second receiving circuit; the second digital reception signal is under a second non-linear influence of the second transmitting circuit, the second AFE circuit, and the first receiving circuit; and a contribution difference between a first contribution made by the second receiving circuit to the first non-linear influence and a second contribution made by the first receiving circuit to the second non-linear influence is lower than −10 decibel (dB).

13. The signal predistortion circuit configuration of claim 11, wherein the first digital reception signal is under a first non-linear influence of the first transmitting circuit, the first AFE circuit, and the second receiving circuit; the second digital reception signal is under a second non-linear influence of the second transmitting circuit, the second AFE circuit, and the first receiving circuit; a first contribution difference between a first contribution made by the second receiving circuit to the first non-linear influence and a second contribution made by the first transmitting circuit and the first AFE circuit to the first non-linear influence is greater than 10 decibel (dB); and a second contribution difference between a third contribution made by the first receiving circuit to the second non-linear influence and a fourth contribution made by the second transmitting circuit and the second AFE circuit to the second non-linear influence is greater than 10 dB.

14. The signal predistortion circuit configuration of claim 10, further comprising:
  a first wiring circuit configured to be coupled with the first AFE circuit and the second receiving circuit in a training mode, and configured to be coupled with the first AFE circuit and the second receiving circuit in a playback mode;
  a second wiring circuit configured to be coupled with the second AFE circuit and the first receiving circuit in the training mode, and configured to be coupled with the second AFE circuit and the first receiving circuit in the playback mode; and
  a digital signal processor (DSP) coupled to the first receiving circuit and the second receiving circuit, the DSP configured to receive and process a first audio signal through the first AFE circuit and the second receiving circuit in the communication mode, and the DSP further configured to receive and process a second audio signal through the second AFE circuit and the first receiving circuit in the communication mode.

* * * * *